US012461215B2

(12) United States Patent
Noguchi (10) Patent No.: US 12,461,215 B2
(45) Date of Patent: Nov. 4, 2025

(54) ULTRASONOGRAPHY APPARATUS, ULTRASOUND IMAGE GENERATION METHOD, AND ULTRASOUND IMAGE GENERATION PROGRAM (71) Applicant: FUJIFILM Corporation, Tokyo (JP)

(72) Inventor: Masafumi Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 119 days.

(21) Appl. No.: 18/509,230

(22) Filed: Nov. 14, 2023

(65) Prior Publication Data

US 2024/0168144 A1    May 23, 2024

(30) Foreign Application Priority Data

Nov. 18, 2022    (JP) .................................. 2022-185238

(51) Int. Cl.
*G01S 7/52* (2006.01)
*A61B 8/00* (2006.01)
(Continued)

(52) U.S. Cl.
CPC ...... *G01S 7/52095* (2013.01); *G01S 15/8927* (2013.01)

(58) Field of Classification Search
CPC ............. G01S 7/52095; G01S 15/8927; G01S 7/52085; A61B 8/4483; A61B 8/5207; A61B 8/54
See application file for complete search history.

(56) References Cited

U.S. PATENT DOCUMENTS

2009/0299185 A1* 12/2009 Oikawa ................ A61B 8/4209
600/447
2010/0107725 A1* 5/2010 Iizuka .................... G01N 29/30
73/1.82
(Continued)

FOREIGN PATENT DOCUMENTS

JP    2017-064249 A    4/2017
JP    2018-187014 A    11/2018

OTHER PUBLICATIONS

The extended European search report issued by the European Patent Office on Apr. 8, 2024, which corresponds to European Patent Application No. 23209192.6-1206 and is related to U.S. Appl. No. 18/509,230.

*Primary Examiner* — Baisakhi Roy
(74) *Attorney, Agent, or Firm* — Studebaker Brackett PLLC (57) ABSTRACT A processor included in the ultrasonography apparatus sets a transducer group including transducers of which the number is larger than the number of the plurality of reception transducers as a delay amount calculation transducer group, and, for each of delay amount calculation transducers included in the delay amount calculation transducer group, acquires a reception delay amount corresponding to a distance between the reception focal point and the delay amount calculation transducer, selects a plurality of the delay amount calculation transducers corresponding to the plurality of reception transducers from the delay amount calculation transducer group for each of the plurality of reception scanning lines, and generates the reception beam signal of the reception scanning line from the reception signal acquired from each of the plurality of reception transducers based on the reception delay amount of the selected plurality of delay amount calculation transducers.

12 Claims, 8 Drawing Sheets

(51) Int. Cl.
*A61B 8/08* (2006.01)
*G01S 15/89* (2006.01)

(56) References Cited

U.S. PATENT DOCUMENTS

| | | | |
|---|---|---|---|
| 2012/0220871 A1* | 8/2012 | Yamamoto | G01S 7/52036 |
| | | | 600/441 |
| 2012/0310096 A1* | 12/2012 | Hongou | A61B 8/4483 |
| | | | 600/447 |
| 2015/0313575 A1 | 11/2015 | Tanaka et al. | |
| 2016/0015361 A1* | 1/2016 | Osawa | A61B 8/4444 |
| | | | 600/472 |
| 2018/0161003 A1 | 6/2018 | Watanabe | |
| 2019/0361102 A1 | 11/2019 | Price et al. | |
| 2020/0367862 A1* | 11/2020 | Taniguchi | A61B 8/4488 |
| 2021/0015462 A1* | 1/2021 | Miyachi | A61B 8/54 |
| 2022/0249065 A1* | 8/2022 | Torii | A61B 8/54 |

\* cited by examiner

ULTRASONOGRAPHY APPARATUS, ULTRASOUND IMAGE GENERATION METHOD, AND ULTRASOUND IMAGE GENERATION PROGRAM

CROSS-REFERENCE TO RELATED APPLICATION

The present application claims priority under 35 U.S.C § 119 to Japanese Patent Application No. 2022-185238, filed on Nov. 18, 2022, which is hereby expressly incorporated by reference, in its entirety, into the present application.

BACKGROUND

Technical Field

The present disclosure relates to an ultrasonography apparatus, an ultrasound image generation method, and an ultrasound image generation program.

Related Art

An ultrasonography apparatus that captures an ultrasound image of a subject by using an ultrasound probe that receives an ultrasound echo of an ultrasonic wave transmitted to the subject with a plurality of transducers and outputs a reception signal based on the received ultrasound echo is known. As such an ultrasonography apparatus, a technique is known in which each of a plurality of reception transducers located in a reception opening among the plurality of transducers generates a reception beam signal for each of a plurality of reception scanning lines by performing beamforming on a reception focal point on the reception scanning line based on a reception signal received for one time of transmission of a transmission beam. In JP 2017-064249 A and JP 2018-187014 A, as beamforming, a technique is disclosed in which a plurality of reception signals are subjected to delay processing to align phases thereof, and then added together.

The technique disclosed in JP2017-064249A and JP2018-187014A has a problem in that a load related to the delay processing on the plurality of reception signals is large. For example, in a case in which a delay amount is calculated from time to time, there is a problem in that the amount of calculation is large. In addition, for example, in a case in which the delay amount obtained in advance is stored in a storage unit, there is a problem in that a storage capacity is extremely large.

SUMMARY

The present disclosure has been made in view of the above circumstances, and an object of the present disclosure is to provide an ultrasonography apparatus, an ultrasound image generation method, and an ultrasound image generation program capable of reducing a load related to delay processing.

In order to achieve the object, a first aspect of the present disclosure provides an ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasonography apparatus comprising: a processor. The processor sets a transducer group including transducers of which the number is larger than the number of the plurality of reception transducers as a delay amount calculation transducer group, and, for each of delay amount calculation transducers included in the delay amount calculation transducer group, acquires a reception delay amount corresponding to a distance between the reception focal point and the delay amount calculation transducer, selects a plurality of the delay amount calculation transducers corresponding to the plurality of reception transducers from the delay amount calculation transducer group for each of the plurality of reception scanning lines, and generates the reception beam signal of the reception scanning line from the reception signal acquired from each of the plurality of reception transducers based on the reception delay amount of the selected plurality of delay amount calculation transducers.

A second aspect of the present disclosure provides the ultrasonography apparatus according to the first aspect, in which the number of the delay amount calculation transducers included in the delay amount calculation transducer group is a number based on a width of the reception opening, the number of the plurality of reception scanning lines, an interval between the plurality of reception scanning lines, and an interval between the transducers.

A third aspect of the present disclosure provides the ultrasonography apparatus according to the second aspect, in which the delay amount calculation transducer group includes the plurality of reception transducers and k transducers located at each end portion of both ends of the plurality of reception transducers, and the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M.

$$(X-1) \div 2 \times W \le k \times H \qquad (1)$$

$$N = M + k \times 2 \qquad (2)$$

A fourth aspect of the present disclosure provides the ultrasonography apparatus according to the second aspect, in which the delay amount calculation transducer group includes the plurality of reception transducers and k transducers located at one end portion of the plurality of reception transducers, and the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M.

$$(X-1) \div 2 \times W \le k \times H \qquad (1)$$

$$N = M + k \qquad (2)$$

A fifth aspect of the present disclosure provides the ultrasonography apparatus according to the first aspect, in which the processor corrects the reception delay amount by adding a predetermined uniform correction amount for each of the plurality of reception transducers corresponding to the reception scanning line.

In addition, in order to achieve the object, a sixth aspect of the present disclosure provides an ultrasound image generation method by an ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasound image generation method causing a processor to execute a process comprising: setting a transducer group including transducers of which the number is larger than the number of the plurality of reception transducers as a delay amount calculation transducer group, and, for each of delay amount calculation transducers included in the delay amount calculation transducer group, acquiring a reception delay amount corresponding to a distance between the reception focal point and the delay amount calculation transducer; selecting a plurality of the delay amount calculation transducers corresponding to the plurality of reception transducers from the delay amount calculation transducer group for each of the plurality of reception scanning lines; and generating the reception beam signal of the reception scanning line from the reception signal acquired from each of the plurality of reception transducers based on the reception delay amount of the selected plurality of delay amount calculation transducers.

According to the present disclosure, it is possible to reduce a load related to delay processing.

DESCRIPTION OF EMBODIMENTS

Hereinafter, an embodiment of the present invention will be described in detail with reference to the drawings. The present embodiment does not limit the present invention.

Figure 1:
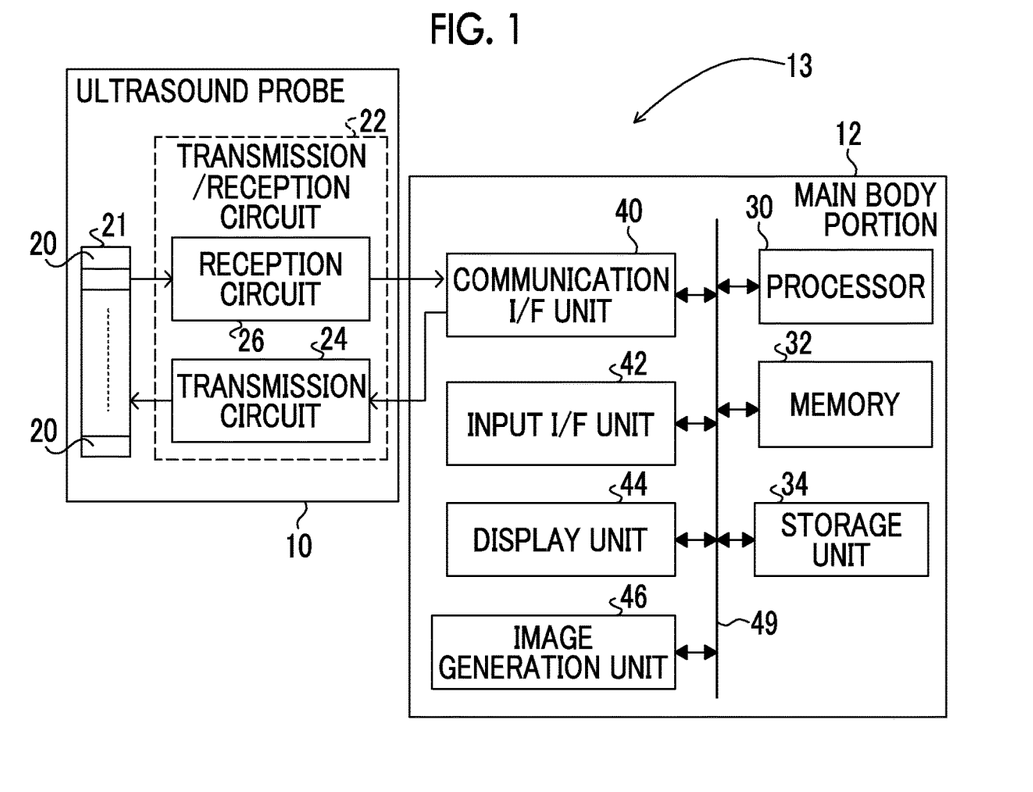
FIG. 1 is a block diagram showing an example of an overall configuration of an ultrasonography apparatus according to an embodiment.

First, an example of an overall configuration of an ultrasonography apparatus 13 according to the present embodiment will be described. FIG. 1 shows a block diagram showing an example of the overall configuration of the ultrasonography apparatus 13 according to the present embodiment. As shown in FIG. 1, the ultrasonography apparatus 13 according to the present embodiment comprises an ultrasound probe 10 and a main body portion 12.

The ultrasound probe 10 comprises a transducer array 21 and a transmission/reception circuit 22 including a transmission circuit 24 and a reception circuit 26. The transducer array 21 comprises a plurality of transducers 20 arranged in a one-dimensional or two-dimensional manner. As an example, in the present embodiment, an aspect in which the ultrasound probe 10 is a linear-type ultrasound probe in which a plurality of transducers are linearly arranged will be described. The ultrasound probe 10 is not limited to this aspect, and may be a convex-type or sector-type ultrasound probe in which the transducers are arranged in a curved manner. Each of the plurality of transducers 20 transmits an ultrasonic wave based on a drive signal applied from the transmission circuit 24, receives an ultrasound echo generated in a subject, and outputs an electric signal in response to the received ultrasound echo.

Each of the plurality of transducer 20 is configured by forming electrodes at both ends of a piezoelectric body which is a piezoelectric material, such as piezoelectric ceramic represented by lead zirconate titanate (PZT), a polymeric piezoelectric element represented by poly vinylidene di fluoride (PVDF), and piezoelectric single crystal represented by lead magnesium niobate-lead titanate (PMN-PT).

The transmission circuit 24 causes the transducer array 21 to transmit an ultrasound beam toward the subject. Specifically, the transmission circuit 24 includes, for example, a plurality of pulse generators (not shown), and, based on a transmission delay pattern selected in response to a control signal from the main body portion 12, each delay amount is adjusted to supply the drive signal and apply a voltage to each of the plurality of transducers included in the transducer array 21. Each drive signal is a pulse-like or continuous wave-like voltage signal, and in a case in which a voltage is applied to the electrodes of the transducers 20 of the transducer array 21, the piezoelectric body expands and contracts. As a result of the expansion and contraction, pulsed or continuous ultrasonic waves are generated from each transducer 20, and an ultrasound beam is formed from a combined wave of these ultrasonic waves.

The transmitted ultrasound beam is reflected by each part (for example, a blood vessel or other tissue) in the subject, an instrument disposed in the subject, or the like, thereby generating an ultrasound echo. The generated ultrasound echo propagates in the subject and is received by the plurality of transducers 20 included in the transducer array 21. Each transducer 20 generates a reception signal corresponding to the received ultrasound echo. The reception signal generated in each transducer 20 is output to the reception circuit 26.

Figure 2:
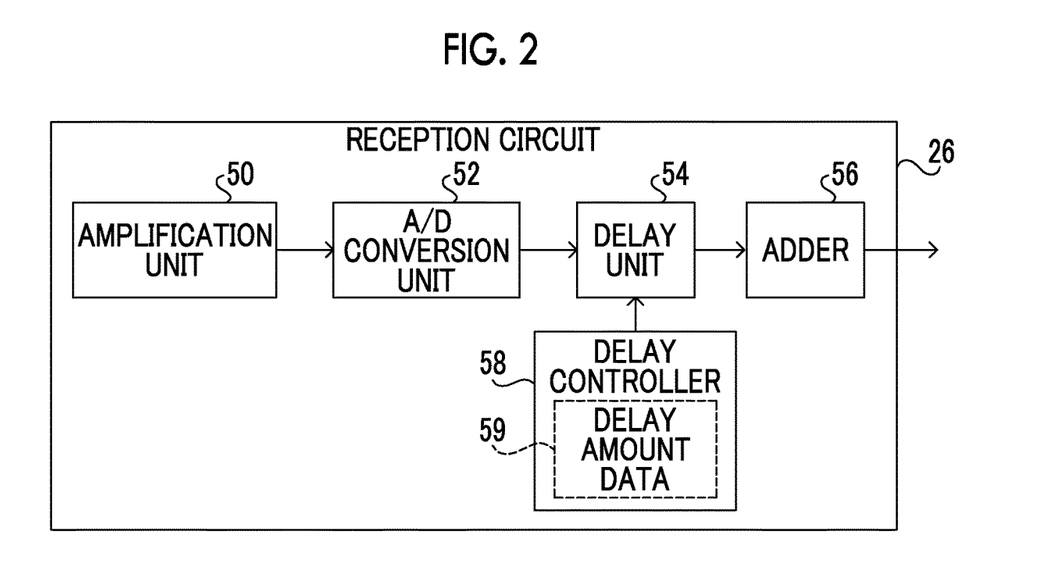
FIG. 2 is a block diagram showing an example of a configuration of a reception circuit.

The reception circuit 26 generates a sound ray signal by performing processing on a reception signal output from the transducer array 21 in accordance with the control signal from the main body portion 12 of the main body portion 12. FIG. 2 is a block diagram showing an example of a configuration of the reception circuit 26 according to the present embodiment. As shown in FIG. 2, the reception circuit 26 includes, for example, an amplification unit 50, an analog digital (AD) conversion unit 52, a delay unit 54, an adder 56, and a delay controller 58.

The amplification unit 50 amplifies the reception signal output from each of the plurality of transducers 20 included in the transducer array 21, and outputs the amplified reception signal to the AD conversion unit 52. The AD conversion unit 52 converts the amplified reception signal into digital reception data, and outputs each converted reception data to the delay unit 54. The delay unit 54 gives a delay amount to each reception data converted by the AD conversion unit 52 based on a reception delay amount selected under the control of the delay controller 58. The adder 56 adds each reception data to which a delay amount is given to perform reception focus processing. Through the reception focus processing, each reception data to which a delay amount is given by the delay unit 54 is phased and added, and a reception beam, which is sound ray signal in which the focal points of the ultrasound echoes have been narrowed, is generated. The generated sound ray signal is output to an image generation unit 46 via a communication interface (I/F) unit 40 of the main body portion 12. Details of operations of the delay unit 54 and the delay controller 58 will be described below.

On the other hand, the main body portion 12 comprises a processor 30, a memory 32, a storage unit 34, the communication I/F unit 40, an input I/F unit 42, a display unit 44, and the image generation unit 46. The processor 30, the memory 32, the storage unit 34, the communication I/F unit 40, the input I/F unit 42, the display unit 44, and the image generation unit 46 are connected to each other via a bus 49 such as a system bus or a control bus such that various kinds of information can be exchanged.

The processor 30 reads out various programs stored in the storage unit 34, to the memory 32 and executes processing according to the read-out program. Thereby, the processor 30 performs control related to the capture of an ultrasound image. The memory 32 is a work memory that is used for the processor 30 to execute processing.

The storage unit 34 stores image data of the ultrasound image generated by the image generation unit 46, various programs executed by the processor 30, various other kinds of information, and the like. Specific examples of the storage unit 34 include a hard disk drive (HDD), a solid state drive (SSD), and a secure digital (SD) card.

The communication I/F unit 40 performs communication of various kinds of information with the ultrasound probe 10 and an external device of the main body portion 12 through wireless communication or wired communication. A control signal for capturing the ultrasound image is output from the main body portion 12 to the ultrasound probe 10 via the communication I/F unit 40. In addition, the sound ray signal is input from the ultrasound probe 10 to the main body portion 12 via the communication I/F unit 40.

The input I/F unit 42 and the display unit 44 function as a user interface. The display unit 44 provides a user with various kinds of information regarding the capturing of the ultrasound image. The display unit 44 is not particularly limited, and examples of the display unit 44 include a liquid crystal monitor and a light emitting diode (LED) monitor. In addition, the input I/F unit 42 is operated by the user in order to input various instructions regarding the capturing of the ultrasound image or the like. The input I/F unit 42 is not particularly limited, and examples of the input I/F unit 42 include a keyboard, a touch pen, and a mouse. A touch panel display in which the input I/F unit 42 and the display unit 44 are integrated may be adopted.

Figure 3:
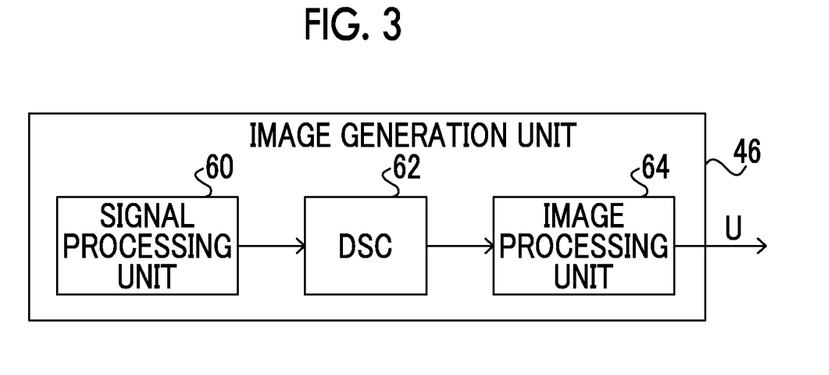
FIG. 3 is a block diagram showing an example of a configuration of an image generation unit.

The image generation unit 46 has a function of generating the ultrasound image based on the sound ray signal input from the reception circuit 26 of the ultrasound probe 10. FIG. 3 shows a block diagram showing an example of a configuration of the image generation unit 46 according to the present embodiment. As shown in FIG. 3, the image generation unit 46 includes, for example, a signal processing unit 60, a digital scan converter (DSC) 62, and an image processing unit 64. The signal processing unit 60 generates a B-mode image signal representing an ultrasound image U by performing, on the sound ray signal generated by the reception circuit 26, attenuation correction due to a distance according to a depth of a reflection position of the ultrasonic wave and then performing envelope detection processing.

The DSC 62 converts the B-mode image signal generated by the signal processing unit 60 into an image signal according to a normal television signal scanning method by raster conversion or the like. The image processing unit 64 performs required various image processing such as gradation processing on the B-mode image signal input from the DSC 62, and then outputs the B-mode image signal. The B-mode image signal output from the image generation unit 46 corresponds to the ultrasound image U.

Figure 4:
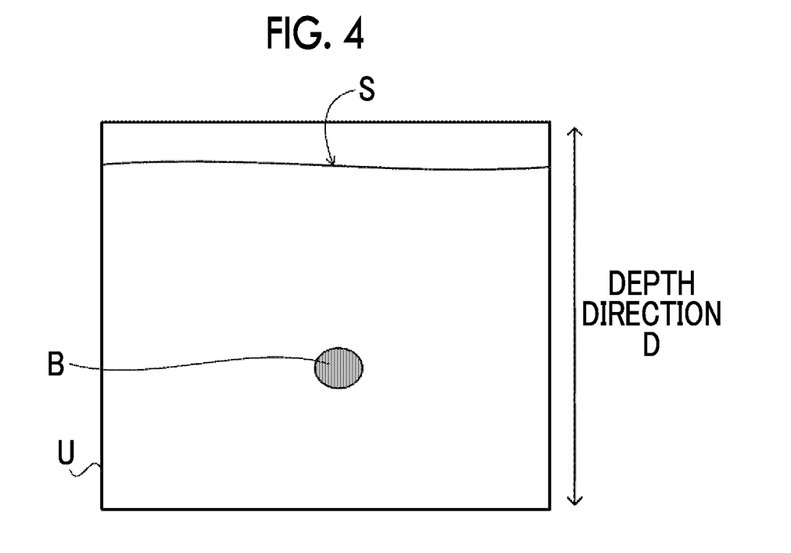
FIG. 4 is a diagram showing an example of an ultrasound image.

FIG. 4 shows an example of the ultrasound image U generated by the image generation unit 46. The ultrasound image U shown in FIG. 4 shows a cross section of a blood vessel B. Here, the cross section of the blood vessel B means a cut surface orthogonal to an extension direction of the blood vessel B. In the present embodiment, as shown in FIG. 4, in the ultrasound image U, each portion of the blood vessel B in the ultrasound image U, in which a direction connecting a body surface S and an inside of the subject is called a depth direction D, is displayed in the depth direction D at a position corresponding to a distance from the body surface S of the subject with which the ultrasound probe 10 is in contact, that is, a depth.

With the above configuration, the ultrasound image U is obtained in the ultrasonography apparatus 13 according to the present embodiment.

Figure 5:
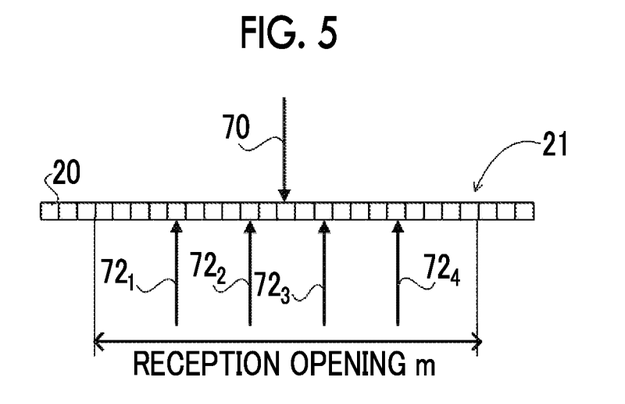
FIG. 5 is a diagram for describing a delay amount for each reception scanning line.

Next, operations of the delay unit 54 and the delay controller 58 of the reception circuit 26 according to the present embodiment will be described in detail. As an example, as shown in FIG. 5, a case will be described in which a width M of a reception opening m (the number of the transducers 20 located in the reception opening m) is 21, and a reception beam is generated by adding a reception signal corresponding to each of a first reception scanning line (reception beam signal) 72₁ to a fourth reception scanning line 72₄ for one time of transmission of a transmission beam 70. Hereinafter, in a case in which the first reception scanning line 72₁ to the fourth reception scanning line 72₄ are collectively referred to without distinguishing each individual, the reception scanning lines are referred to as a reception scanning line 72 without reference numerals 1 to 4 for distinguishing each individual. In addition, hereinafter, the transducer 20 located in the reception opening m is referred to as a "reception transducer".

Figure 6A:
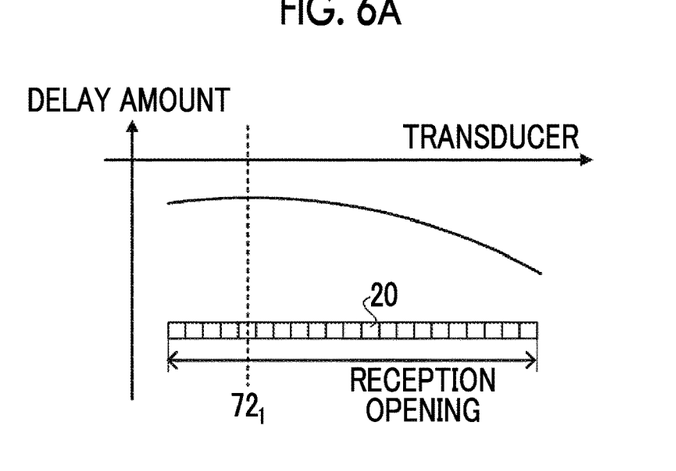
FIG. 6A is a diagram for describing an example of a reception delay amount corresponding to a first reception scanning line in each transducer in a reception opening.
Figure 6B:
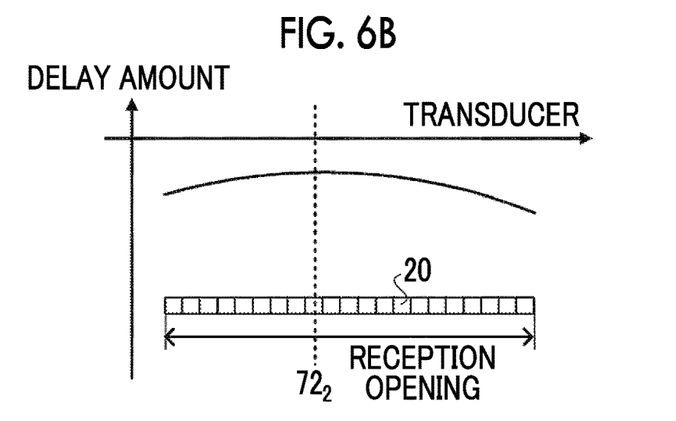
FIG. 6B is a diagram for describing an example of a reception delay amount corresponding to a second reception scanning line in each transducer in the reception opening.
Figure 6C:
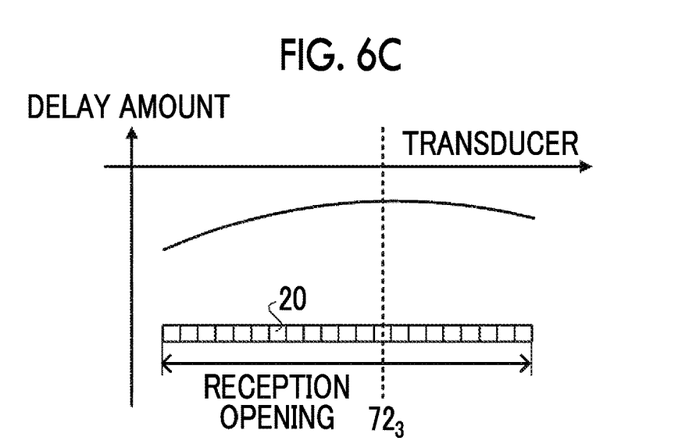
FIG. 6C is a diagram for describing an example of a reception delay amount corresponding to a third reception scanning line in each transducer in the reception opening.
Figure 6D:
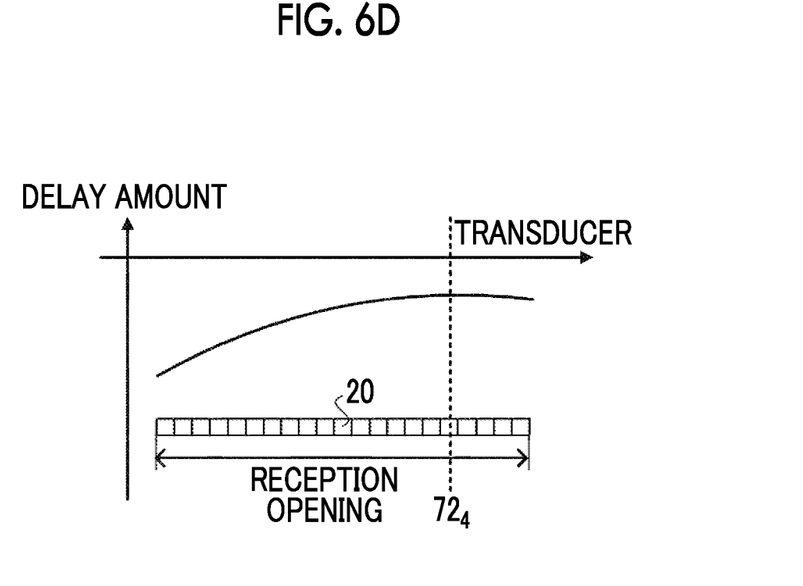
FIG. 6D is a diagram for describing an example of a reception delay amount corresponding to a fourth reception scanning line in each transducer in the reception opening.

A reception delay amount for delaying movement of the reception signal of the reception transducer 20 is larger as the reception transducer 20 is closer to the reception scanning line 72, and smaller as the reception transducer 20 is farther from the reception scanning line 72. For example, in a case in which a reception beam corresponding to the first reception scanning line $72_1$ is generated, a reception delay amount for delaying a phase of the reception signal of each reception transducer 20 in the reception opening m is as shown in FIG. 6A. In addition, in a case in which a reception beam corresponding to the second reception scanning line $72_2$ is generated, a reception delay amount for delaying a phase of the reception signal of each reception transducer 20 in the reception opening m is as shown in FIG. 6B. In addition, in a case in which a reception beam corresponding to the third reception scanning line $72_3$ is generated, a reception delay amount for delaying a phase of the reception signal of each reception transducer 20 in the reception opening m is as shown in FIG. 6C. Further, in a case in which a reception beam corresponding to the fourth reception scanning line $72_4$ is generated, a reception delay amount for delaying a phase of the reception signal of each reception transducer 20 in the reception opening m is as shown in FIG. 6D. As shown in FIGS. 6A to 6D, the reception delay amount of each reception transducer 20 varies depending on the corresponding reception scanning line 72. The reception delay amount of each reception transducer 20 in each reception scanning line 72 varies depending on a distance between the reception transducer 20 and a reception focal point. The longer the distance between the reception transducer 20 and the reception focal point, the larger the reception delay amount.

Figure 7:
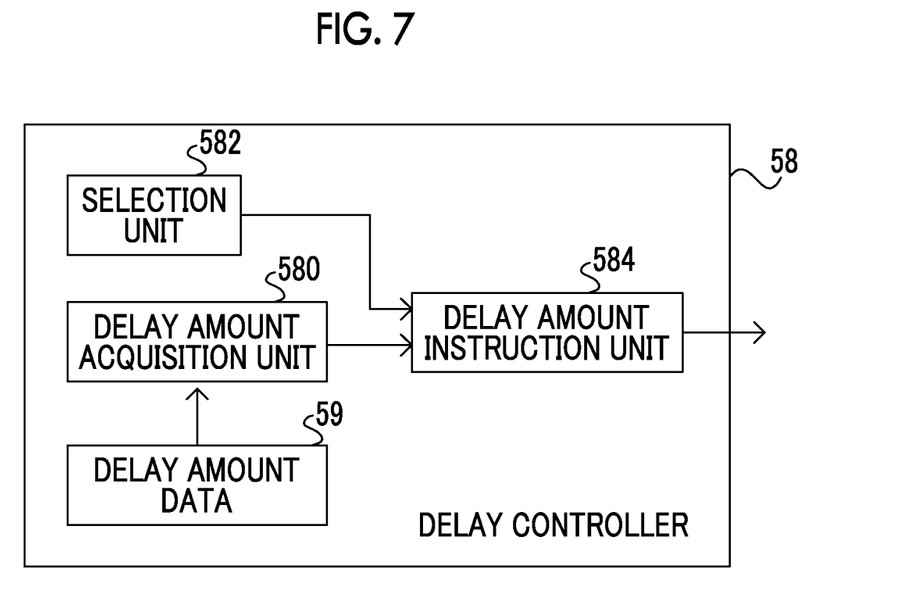
FIG. 7 is a block diagram showing an example of a configuration of a delay controller.

The delay controller 58 according to the present embodiment acquires the reception delay amount (see FIGS. 6A to 6D) corresponding to each reception scanning line 72 from delay amount data 59 and outputs the acquired reception delay amount to the delay unit 54. FIG. 7 shows a block diagram showing an example of a configuration of the delay controller 58 according to the present embodiment. As shown in FIG. 7, the delay controller 58 according to the present embodiment comprises a delay amount acquisition unit 580, a selection unit 582, and a delay amount instruction unit 584. The delay controller 58 shown in FIG. 7 is configured to include a processor and a memory, and the memory stores the delay amount data 59 and various programs executed by the processor. By executing the program stored in the memory, the processor functions as the delay amount acquisition unit 580, the selection unit 582, and the delay amount instruction unit 584.

Figure 8:
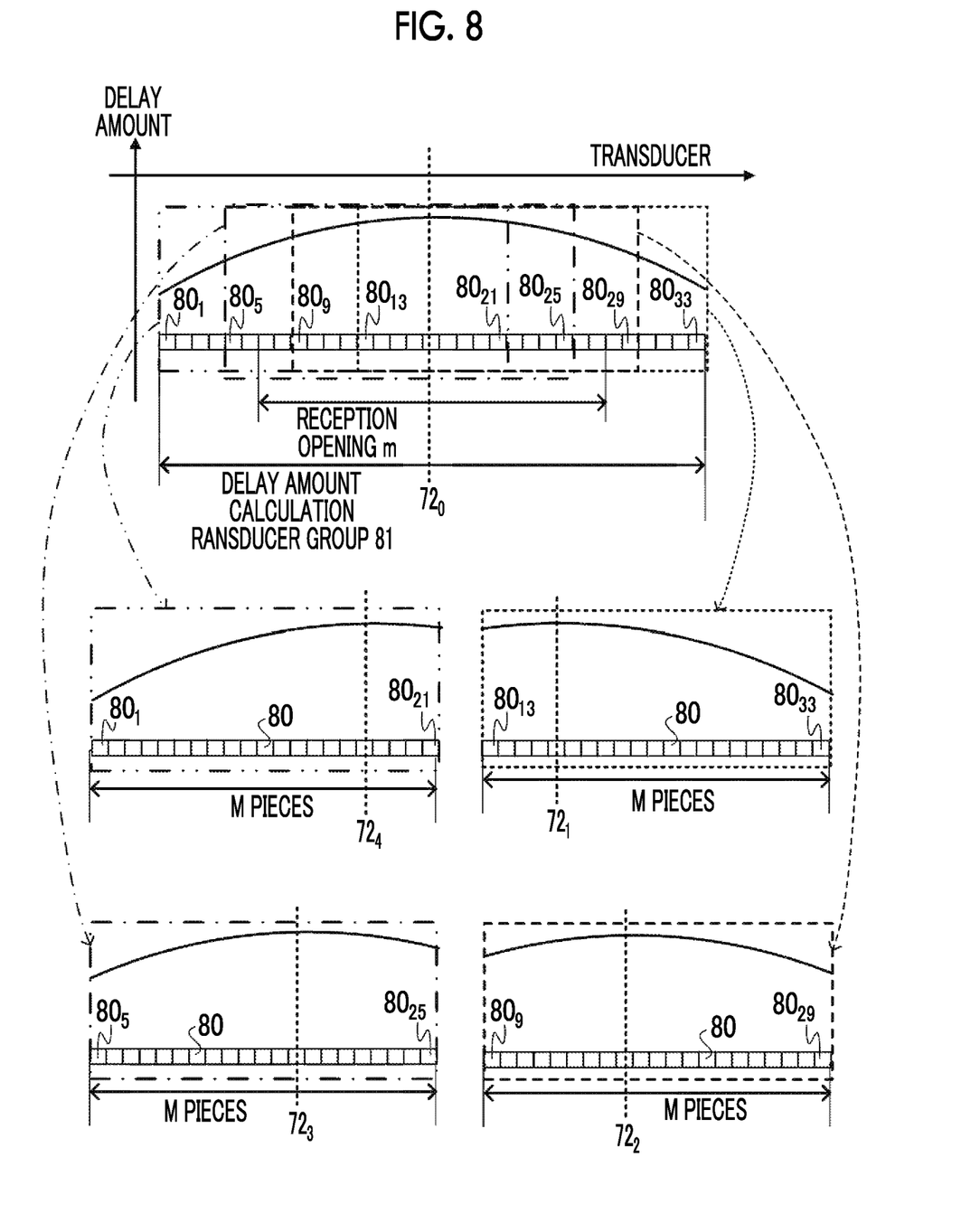
FIG. 8 is a diagram for describing a delay amount for each reception scanning line.

In the present embodiment, as shown in FIG. 8, a transducer group including the transducers 20 of which the number is larger than the number of the plurality of reception transducers 20 located in the reception opening m is set as a delay amount calculation transducer group 81. In the example shown in FIG. 8, a reference scanning line 720 serving as a reference of the delay amount is centered, and the delay amount calculation transducer group 81 includes 33 delay amount calculation transducers 80 ($80_1$ to $80_{33}$). In the present embodiment, information representing a correspondence relationship between the delay amount and the transducer in FIG. 8 is stored in advance in the memory in the delay controller 58 as the delay amount data 59. The correspondence relationship between the delay amount and the transducer shown in FIG. 8 is provided for each reception focal point as described above. The correspondence relationship between the delay amount and the transducer may vary depending on a type of the ultrasound probe 10 and the like. Therefore, the delay amount data 59 preferably includes information representing a correspondence relationship between a plurality of delay amounts and the transducers associated with the type of the ultrasound probe 10 and the like.

The delay amount acquisition unit 580 has a function of acquiring, from the delay amount data 59, a reception delay amount corresponding to a distance between the reception focal point on the reception scanning line 72 and the delay amount calculation transducer 80 for each of the delay amount calculation transducers 80 included in the delay amount calculation transducer group 81.

The selection unit 582 selects a plurality of the delay amount calculation transducers 80 corresponding to the plurality of reception transducers 20 from the delay amount calculation transducer group 81 for each reception scanning line 72.

Specifically, as shown in FIG. 8, the selection unit 582 selects 21 delay amount calculation transducers $80_{13}$ to $80_{33}$ from the delay amount calculation transducer group 81 for the first reception scanning line $72_1$. As can be seen by comparing FIG. 8 and FIG. 6A, the reception delay amount of each of the delay amount calculation transducers $80_{13}$ to $80_{33}$ for the first reception scanning line $72_1$ is the same as the reception delay amount of the reception transducer 20 in the reception opening m. In addition, the selection unit 582 selects 21 delay amount calculation transducers $80_9$ to $80_{29}$ from the delay amount calculation transducer group 81 for the second reception scanning line $72_2$. As can be seen by comparing FIG. 8 and FIG. 6B, the reception delay amount of each of the delay amount calculation transducers $80_9$ to $80_{29}$ for the second reception scanning line $72_2$ is the same as the reception delay amount of the reception transducer 20 in the reception opening m. In addition, the selection unit 582 selects 21 delay amount calculation transducers $80_5$ to $80_{25}$ from the delay amount calculation transducer group 81 for the third reception scanning line $72_3$. As can be seen by comparing FIG. 8 and FIG. 6C, the reception delay amount of each of the delay amount calculation transducers $80_5$ to $80_{25}$ for the third reception scanning line $72_3$ is the same as the reception delay amount of the reception transducer 20 in the reception opening m. In addition, the selection unit 582 selects 21 delay amount calculation transducers $80_1$ to $80_{21}$ from the delay amount calculation transducer group 81 for the fourth reception scanning line $72_4$. As can be seen by comparing FIG. 8 and FIG. 6D, the reception delay amount of each of the delay amount calculation transducers $80_1$ to $80_{21}$ for the fourth reception scanning line $72_4$ is the same as the reception delay amount of the reception transducer 20 in the reception opening m.

The delay amount instruction unit 584 outputs, for each reception scanning line 72, the reception delay amount of the delay amount calculation transducer 80 selected by the selection unit 582 from the reception delay amount of each delay amount calculation transducer 80 in the delay amount calculation transducer group 81 acquired by the delay amount acquisition unit 580, to the delay unit 54. Specifically, the delay amount acquisition unit 580 outputs the reception delay amount of each of the delay amount calculation transducers $80_{13}$ to $80_{33}$ for the first reception scanning line $72_1$, to the delay unit 54. As a result, the delay unit 54 delays a phase of a reception signal of the first reception scanning line $72_1$ based on the reception delay amount of each of the delay amount calculation transducers $80_{13}$ to $80_{33}$, and outputs the delayed first reception scanning line $72_1$ to the adder 56. In addition, the delay amount acquisition unit 580 outputs the delay amount of each of the delay amount calculation transducers $80_9$ to $80_{29}$ for the second reception scanning line $72_2$, to the delay unit 54. As a result, the delay unit 54 delays a phase of a reception signal of the second reception scanning line $72_2$ based on the reception delay amount of each of the delay amount calculation transducers $80_9$ to $80_{29}$, and outputs the delayed second reception scanning line $72_2$ to the adder 56. In addition, the delay amount acquisition unit 580 outputs the delay amount of each of the delay amount calculation transducers $80_5$ to $80_{25}$ for the third reception scanning line $72_3$, to the delay unit 54. As a result, the delay unit 54 delays a phase of a reception signal of the third reception scanning line $72_3$ based on the reception delay amount of each of the delay amount calculation transducers $80_5$ to $80_{25}$, and outputs the delayed third reception scanning line $72_3$ to the adder 56. In addition, the delay amount acquisition unit 580 outputs the delay amount of each of the delay amount calculation transducers $80_1$ to $80_{21}$ for the fourth reception scanning line $72_4$, to the delay unit 54. As a result, the delay unit 54 delays a phase of a reception signal of the fourth reception scanning line 724 based on the reception delay amount of each of the delay amount calculation transducers $80_1$ to $80_{21}$, and outputs the delayed fourth reception scanning line $72_4$ to the adder 56.

The adder 56 generates the reception beam signal on each reception scanning line 72 from the reception signal of which the phase is delayed as described above.

As in the example shown in FIG. 8, in a case in which the delay amount calculation transducer group 81 includes the delay amount calculation transducers 80 corresponding to the plurality of reception transducers 20 and k delay amount calculation transducers 80 located at each end portion of both ends of the reception transducers 20, the number k of the delay amount calculation transducers 80 preferably satisfies Expression (1) in a case in which the number of the plurality of reception scanning lines 72 is X, the interval between the plurality of reception scanning lines 72 is W, and the interval between the transducers 20 is H.

$(X-1) \div 2 \times W \leq k \times H$ (1)

In this case, the number N of the delay amount calculation transducers 80 included in the delay amount calculation transducer group 81 satisfies Expression (2) in a case in which the width of the reception opening m is M.

$N = M + k \times 2$ (2)

In addition, unlike the example shown in FIG. 8, in a case in which the delay amount calculation transducer group 81 includes the delay amount calculation transducers 80 corresponding to the plurality of reception transducers 20 and k delay amount calculation transducers 80 located at one end portion of the plurality of reception transducers 20, the number k of the delay amount calculation transducers 80 preferably satisfies Expression (3) in a case in which the number of the plurality of reception scanning lines 72 is X, the interval between the plurality of reception scanning lines 72 is W, and the interval between the transducers 20 is H.

$(X-1) \div 2 \times W \leq k \times H$ (3)

In this case, the number N of the delay amount calculation transducers 80 included in the delay amount calculation transducer group 81 satisfies Expression (4) in a case in which the width of the reception opening m is M.

$N = M + k$ (4)

In a case of an aspect in which k delay amount calculation transducers 80 are provided at one end portion of the reception transducers, it is preferable that the positions of the reception scanning lines 72 are bilaterally symmetrical with respect to the center of the reception opening m.

The reception beam signal generated in this manner is output from the reception circuit 26, and the ultrasound image U is generated by the image generation unit 46 of the main body portion 12.

As described above, in the reception circuit 26 of the ultrasonography apparatus 13 according to the present embodiment, the delay amount of each of the plurality of delay amount calculation transducers 80 included in the delay amount calculation transducer group 81, that is, the information representing the correspondence relationship between the delay amount and the transducer shown in FIG. 8 need only be stored as the delay amount data 59. Accordingly, the load related to the delay processing can be reduced more than in a case where the delay amount of the corresponding transducer 20 is calculated for each reception scanning line 72 or in a case in which the delay amount of the corresponding transducer 20 is stored for each reception scanning line 72. For example, in a case in which the delay amount of the transducer 20 is stored for each reception scanning line 72 unlike the present embodiment, the information representing the correspondence relationship between the delay amount and the transducer shown in FIGS. 6A and 6D is stored. That is, the delay amount equivalent to 21 the reception transducers 20×4 reception scanning lines 72=84 is stored. On the other hand, in the present embodiment, since the delay amount of each of 33 delay amount calculation transducers 80 need only be stored, the load related to the delay processing can be reduced.

In a case in which the transmission beam 70 is a converging beam having a focal point, for example, as in the technique disclosed in JP 2017-064249 A, a delay amount in consideration of a wave front of the beam may be corrected. In this case, the reception delay amount may be corrected by adding a predetermined uniform correction amount for each of the plurality of reception transducers corresponding to the reception scanning line, and then corrected by the delay amount corresponding to each reception transducer.

Figure 9:
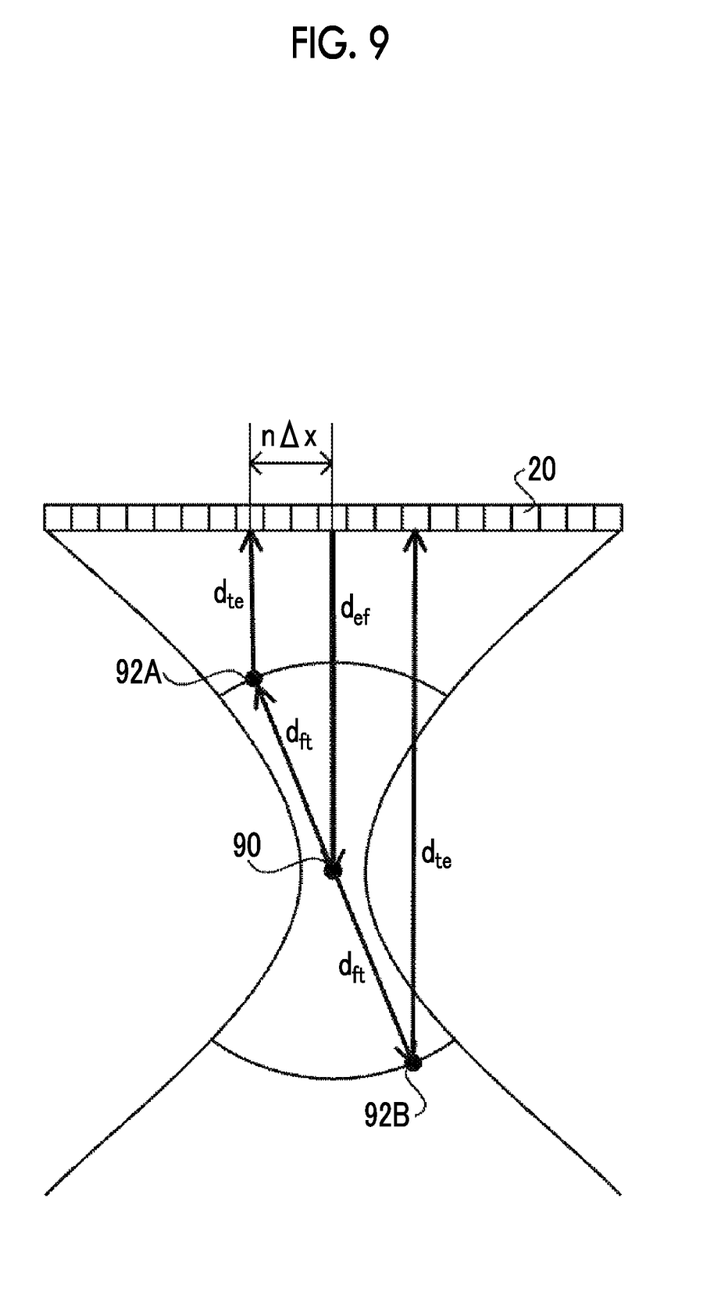
FIG. 9 is a diagram for describing a time required for transmission and reception of an ultrasonic wave.

Specifically, as shown in FIG. 9, in a case in which a pitch of the transducer 20 is $n\Delta x$, a distance between a transmission focal point 90 and the transducer 20 in the transmission beam is $d_{ef}$, a distance between each of reception focal points 92A and 92B and the reception transducer 20 is $d_{te}$, and a distance between the transmission focal point 90 and the reception focal point 91 is $d_{ft}$, a time required for transmission and reception of the ultrasonic wave is represented by Expressions (5) and (6). Expression (5) corresponds to the reception focal point 92A and is a case in which the distance die is shorter than the distance $d_{ef}$. In addition, Expression (6) corresponds to the reception focal point 92B and is a case in which the distance die is longer than the distance $d_{ef}$.

$$t = \frac{d_{ef} - d_{ft} + d_{te}}{c} \quad (5)$$

$$= \frac{d_{ef} - \sqrt{(d_{ef} - d_{te})^2 + (n\Delta x)^2} + d_{te}}{c}$$

$$= \frac{2d_{te}}{c}$$

-continued $$t = \frac{d_{ef} + d_{ft} + d_{te}}{c}$$
$$= \frac{d_{ef} + \sqrt{(d_{te} - d_{ef})^2 + (n\Delta x)^2} + d_{te}}{c}$$
$$= \frac{2d_{te}}{c} \quad (6)$$

Figure 10:
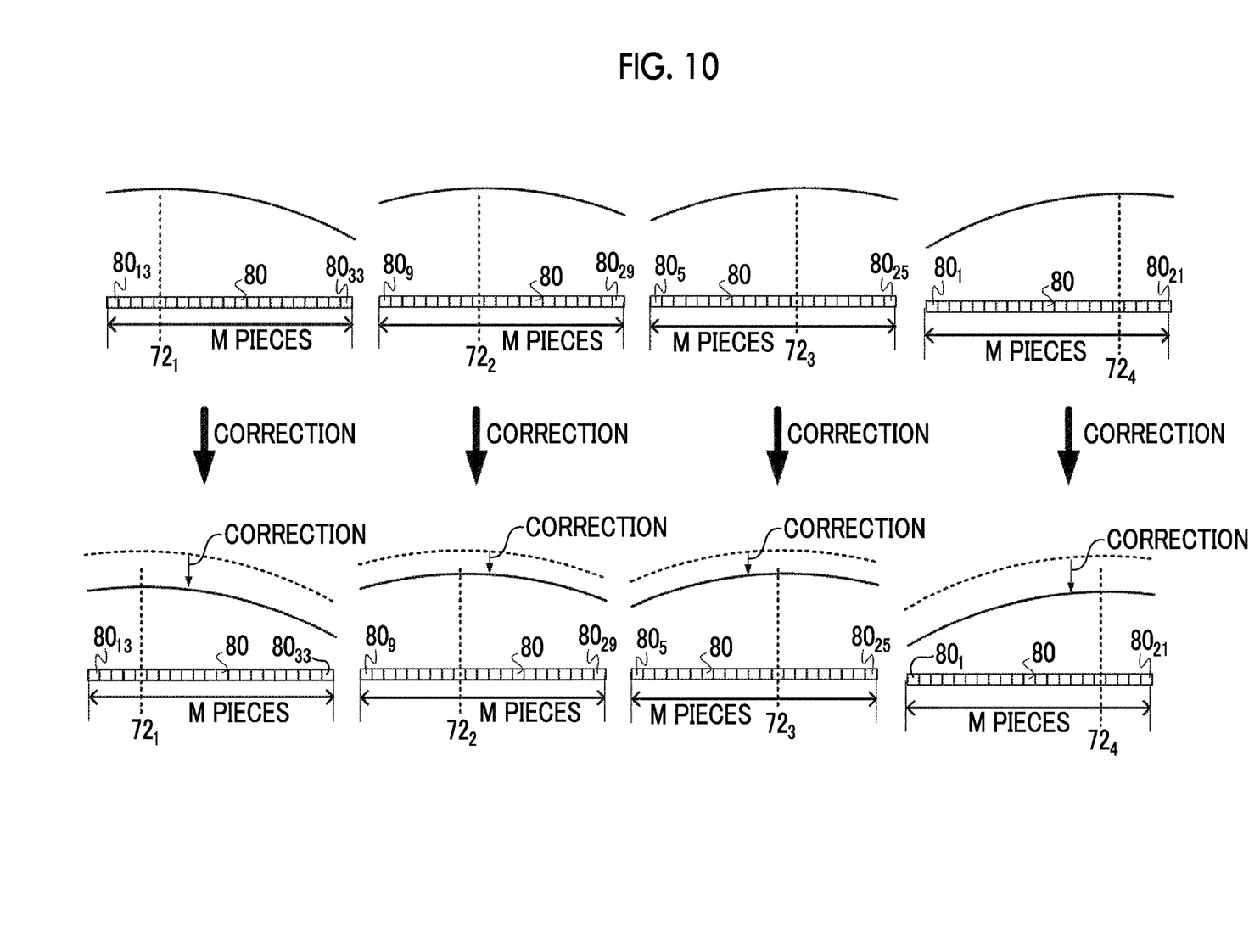
FIG. 10 is a diagram for describing correction of a reception delay amount.

Therefore, as shown in FIG. 10, for each reception scanning line 72, the delay amount corresponding to each of the delay amount calculation transducers 80 may be corrected by adding the correction amount corresponding to $2d_{te}/c$ according to Expressions (5) and (6), and then corrected by the delay amount corresponding to each reception transducer.

Figure 11:
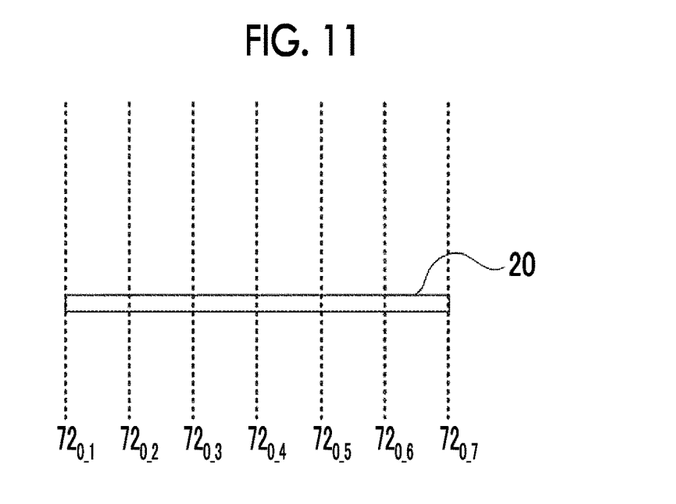
FIG. 11 is a diagram for describing a positional relationship between a transducer and a reference scanning line.
Figure 12:
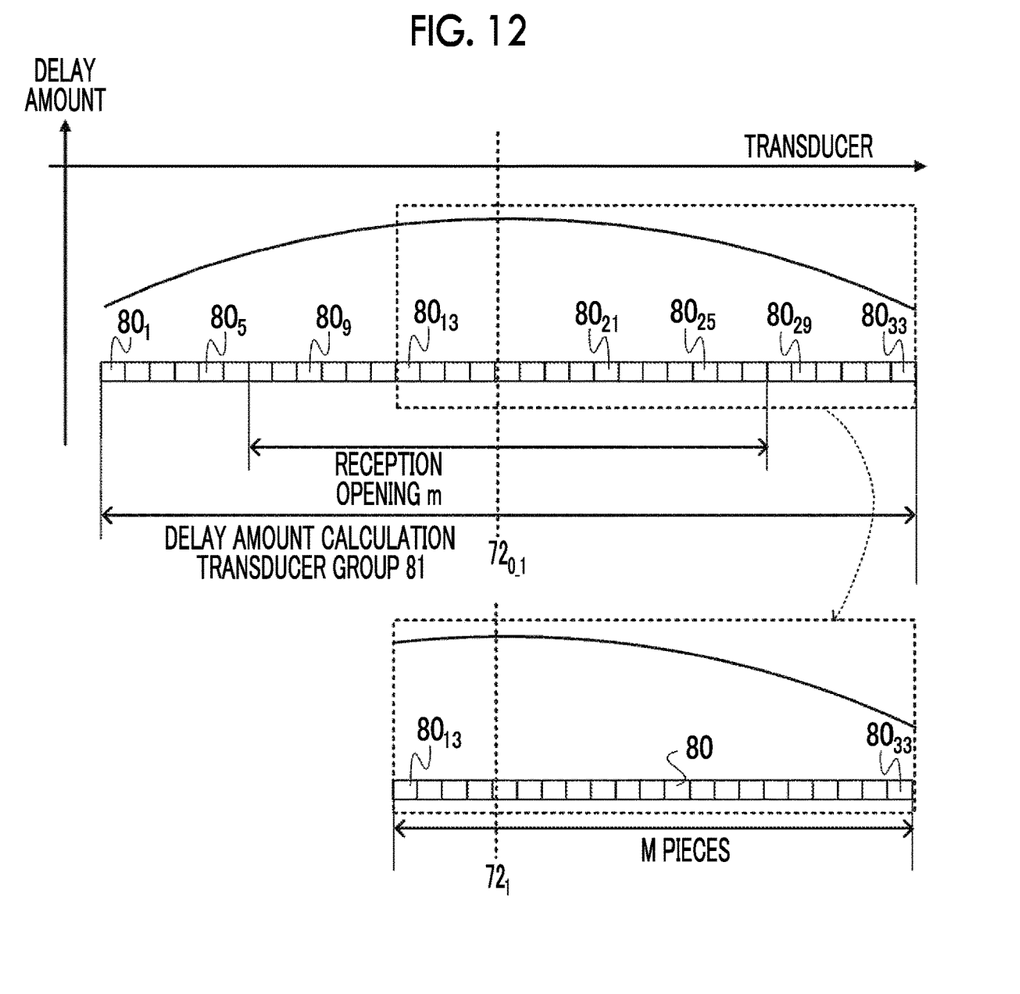
FIG. 12 is a diagram for describing a reception delay amount according to the positional relationship between the transducer and the reference scanning line.

In addition, a position of the reference scanning line $72_0$ with respect to one transducer 20 may vary depending on the interval between the reception scanning lines 72. For example, in each of reference scanning lines $72_{0\_1}$ to $72_{0\_7}$ shown in FIG. 11, a positional relationship between the transducer 20 and the reference scanning line $72_0$ is different. In a case in which the positional relationship between the transducer 20 and the reference scanning line $72_0$ is different, the delay amount corresponding to the transducer 20 is different. For example, as shown in FIG. 12, in a case of the reference scanning line $72_{0\_1}$, a delay amount curve representing the delay amount is in a state of being shifted to the left side compared to the case shown in FIG. 8. As described above, since the delay amount with respect to the transducer 20 varies depending on the positional relationship between the transducer 20 and the reference scanning line $72_0$, it is preferable to provide information representing the correspondence relationship between the plurality of delay amounts and the transducers 20 according to the positional relationship between the transducer 20 and the reference scanning line $72_0$ as the delay amount data 59, and to select the correspondence relationship to be used according to the positional relationship between the transducer 20 and the reference scanning line $72_0$.

The technique of the present disclosure is not limited to each of the above-described embodiments, and various modifications can be made.

In each of the above-described embodiments, the image generation unit 46 that generates the ultrasound image U based on the sound ray signal is provided in the main body portion 12, but instead of this, the image generation unit 46 may be provided in the ultrasound probe 10. In this case, the ultrasound probe 10 generates the ultrasound image U and outputs the ultrasound image U to the main body portion 12. The main body portion 12 displays the ultrasound image U input from the ultrasound probe 10 on the display unit 44.

In addition, in the above-described embodiment, for example, as a hardware structure of a processing unit that executes various types of processing, such as the delay controller 58, the following various processors can be used. As described above, the various processors include, in addition to a central processing unit (CPU) which is a general-purpose processor that executes software (program) to function as various processing units, a programmable logic device (PLD) which is a processor whose circuit configuration can be changed after manufacturing such as a field programmable gate array (FPGA), and a dedicated circuitry which is a processor having a circuit configuration specifically designed to execute specific processing such as an application specific integrated circuit (ASIC).

One processing unit may be configured of one of the various processors, or may be configured of a combination of the same or different kinds of two or more processors (for example, a combination of a plurality of FPGAs or a combination of the CPU and the FPGA). In addition, a plurality of processing units may be configured of one processor.

As an example in which a plurality of processing units are configured of one processor, first, as typified by a computer such as a client or a server, there is an aspect in which one processor is configured of a combination of one or more CPUs and software, and this processor functions as a plurality of processing units. Second, as typified by a system on chip (SoC) or the like, there is an aspect in which a processor that implements functions of the entire system including the plurality of processing units via one integrated circuit (IC) chip is used. As described above, various processing units are configured by using one or more of the various processors as a hardware structure.

Further, as the hardware structure of the various processors, more specifically, an electric circuit (circuitry) in which circuit elements such as semiconductor elements are combined may be used.

In addition, in each of the above-described embodiments, an aspect in which the program executed by the processor of the delay controller 58 is stored (installed) in advance in the memory of the delay controller 58 has been described, but the present disclosure is not limited to this. The program executed by the delay controller 58 may be provided in an aspect in which the program is recorded in a recording medium such as a compact disc read only memory (CD-ROM), a digital versatile disc read only memory (DVD-ROM), and a universal serial bus (USB) memory. In addition, an aspect may be adopted in which the program executed by the delay controller 58 may be downloaded from an external device via a network.

From the above description, the invention described in Appendices described below can be grasped.

Appendix 1

An ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasonography apparatus comprising: a processor, in which the processor sets a transducer group including transducers of which the number is larger than the number of the plurality of reception transducers as a delay amount calculation transducer group, and, for each of delay amount calculation transducers included in the delay amount calculation transducer group, acquires a reception delay amount corresponding to a distance between the reception focal point and the delay amount calculation transducer, selects a plurality of the delay amount calculation transducers corresponding to the plurality of reception transducers from the delay amount calculation transducer group for each of the plurality of reception scanning lines, and generates the reception beam signal of the reception scanning line from the reception signal acquired from each of the plurality of reception transducers based on the reception delay amount of the selected plurality of delay amount calculation transducers.

Appendix 2

The ultrasonography apparatus according to Appendix 1, in which the number of the delay amount calculation transducers included in the delay amount calculation transducer group is a number based on a width of the reception opening, the number of the plurality of reception scanning lines, an interval between the plurality of reception scanning lines, and an interval between the transducers.

Appendix 3

The ultrasonography apparatus according to Appendix 2, in which the delay amount calculation transducer group includes the plurality of reception transducers and k transducers located at each end portion of both ends of the plurality of reception transducers, and the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M, $$(X-1) \div 2 \times W \leq k \times H \quad (1)$$

$$N = M + k \times 2 \quad (2).$$

Appendix 4

The ultrasonography apparatus according to Appendix 2, in which the delay amount calculation transducer group includes the plurality of reception transducers and k transducers located at one end portion of the plurality of reception transducers, and the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M, $$(X-1) \div 2 \times W \leq k \times H \quad (1)$$

$$N = M + k \quad (2).$$

Appendix 5

The ultrasonography apparatus according to any one of Appendices 1 to 4, in which the processor corrects the reception delay amount by adding a predetermined uniform correction amount for each of the plurality of reception transducers corresponding to the reception scanning line.

Appendix 6

The ultrasonography apparatus according to any one of Appendices 1 to 5, in which a plurality of pieces of information representing a correspondence relationship between the reception delay amount and the reception transducer are provided according to a positional relationship between the reception transducer and a predetermined reference scanning line among the plurality of reception scanning lines, and the processor generates the reception beam signal by using the correspondence relationship selected according to the positional relationship between the reference scanning line and the reception transducer.

Appendix 7

An ultrasound image generation method by an ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasound image generation method causing a processor to execute a process comprising: setting a transducer group including transducers of which the number is larger than the number of the plurality of reception transducers as a delay amount calculation transducer group, and, for each of delay amount calculation transducers included in the delay amount calculation transducer group, acquiring a reception delay amount corresponding to a distance between the reception focal point and the delay amount calculation transducer; selecting a plurality of the delay amount calculation transducers corresponding to the plurality of reception transducers from the delay amount calculation transducer group for each of the plurality of reception scanning lines; and generating the reception beam signal of the reception scanning line from the reception signal acquired from each of the plurality of reception transducers based on the reception delay amount of the selected plurality of delay amount calculation transducers.

What is claimed is:
1. An ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasonography apparatus comprising:
   a processor, the processor being configured to:
      set a transducer group including transducers of which the number is larger than the number of the plurality of reception transducers as a delay amount calculation transducer group, and, for each of delay amount calculation transducers included in the delay amount calculation transducer group, acquires a reception delay amount corresponding to a distance between the reception focal point and the delay amount calculation transducer,
      select a plurality of the delay amount calculation transducers corresponding to the plurality of reception transducers from the delay amount calculation transducer group for each of the plurality of reception scanning lines, and
      generate the reception beam signal of the reception scanning line from the reception signal acquired from each of the plurality of reception transducers based on the reception delay amount of the selected plurality of delay amount calculation transducers,
   wherein the number of the delay amount calculation transducers included in the delay amount calculation transducer group is a number based on a width of the reception opening, the number of the plurality of recep- tion scanning lines, an interval between the plurality of reception scanning lines, and an interval between the transducers, the delay amount calculation transducer group includes the plurality of reception transducers and k transducers located at each end portion of both ends of the plurality of reception transducers, and the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M, $$(X-1) \div 2 \times W \leq k \times H \quad (1)$$

$$N = M + k \times 2 \quad (2).$$

2. The ultrasonography apparatus according to claim 1, wherein the processor corrects the reception delay amount by adding a predetermined uniform correction amount for each of the plurality of reception transducers corresponding to the reception scanning line.

3. The ultrasonography apparatus according to claim 1, wherein:
   a plurality of pieces of information representing a correspondence relationship between the reception delay amount and the reception transducer are provided according to a positional relationship between the reception transducer and a predetermined reference scanning line among the plurality of reception scanning lines, and
   the processor generates the reception beam signal by using the correspondence relationship selected according to the positional relationship between the reference scanning line and the reception transducer.

4. An ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasonography apparatus comprising:
   a processor, the processor being configured to:
      set a transducer group including transducers of which the number is larger than the number of the plurality of reception transducers as a delay amount calculation transducer group, and, for each of delay amount calculation transducers included in the delay amount calculation transducer group, acquires a reception delay amount corresponding to a distance between the reception focal point and the delay amount calculation transducer,
      select a plurality of the delay amount calculation transducers corresponding to the plurality of reception transducers from the delay amount calculation transducer group for each of the plurality of reception scanning lines, and
      generate the reception beam signal of the reception scanning line from the reception signal acquired from each of the plurality of reception transducers based on the reception delay amount of the selected plurality of delay amount calculation transducers, wherein the number of the delay amount calculation transducers included in the delay amount calculation transducer group is a number based on a width of the reception opening, the number of the plurality of reception scanning lines, an interval between the plurality of reception scanning lines, and an interval between the transducers, the delay amount calculation transducer group includes the plurality of reception transducers and k transducers located at one end portion of the plurality of reception transducers, and the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M, $$(X-1) \div 2 \times W \leq k \times H \quad (1)$$

$$N = M + k \times 2 \quad (2).$$

5. The ultrasonography apparatus according to claim 4, wherein the processor corrects the reception delay amount by adding a predetermined uniform correction amount for each of the plurality of reception transducers corresponding to the reception scanning line.

6. The ultrasonography apparatus according to claim 4, wherein:
   a plurality of pieces of information representing a correspondence relationship between the reception delay amount and the reception transducer are provided according to a positional relationship between the reception transducer and a predetermined reference scanning line among the plurality of reception scanning lines, and
   the processor generates the reception beam signal by using the correspondence relationship selected according to the positional relationship between the reference scanning line and the reception transducer.

7. An ultrasound image generation method by an ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasound image generation method causing a processor to execute a process comprising:
   setting a transducer group including transducers of which the number is larger than the number of the plurality of reception transducers as a delay amount calculation transducer group, and, for each of delay amount calculation transducers included in the delay amount calculation transducer group, acquiring a reception delay amount corresponding to a distance between the reception focal point and the delay amount calculation transducer;
   selecting a plurality of the delay amount calculation transducers corresponding to the plurality of reception transducers from the delay amount calculation transducer group for each of the plurality of reception scanning lines; and generating the reception beam signal of the reception scanning line from the reception signal acquired from each of the plurality of reception transducers based on the reception delay amount of the selected plurality of delay amount calculation transducers, wherein the number of the delay amount calculation transducers included in the delay amount calculation transducer group is a number based on a width of the reception opening, the number of the plurality of reception scanning lines, an interval between the plurality of reception scanning lines, and an interval between the transducers, the delay amount calculation transducer group includes the plurality of reception transducers and k transducers located at each end portion of both ends of the plurality of reception transducers, and the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M, $$(X-1) \div 2 \times W \leq k \times H \quad (1)$$

$$N = M + k \times 2 \quad (2).$$

8. The ultrasound image generation method according to claim 7, further comprising correcting the reception delay amount by adding a predetermined uniform correction amount for each of the plurality of reception transducers corresponding to the reception scanning line.

9. The ultrasound image generation method according to claim 7, wherein:
   a plurality of pieces of information representing a correspondence relationship between the reception delay amount and the reception transducer are provided according to a positional relationship between the reception transducer and a predetermined reference scanning line among the plurality of reception scanning lines, and
   the method further comprises generating the reception beam signal by using the correspondence relationship selected according to the positional relationship between the reference scanning line and the reception transducer.

10. An ultrasound image generation method by an ultrasonography apparatus in which each of a plurality of reception transducers located in a reception opening among a plurality of transducers disposed in a row generates a reception beam signal for each of a plurality of reception scanning lines by performing beamforming on a reception focal point on the reception scanning line based on a reception signal received for one time of transmission of a transmission beam, the ultrasound image generation method causing a processor to execute a process comprising:
   setting a transducer group including transducers of which the number is larger than the number of the plurality of reception transducers as a delay amount calculation transducer group, and, for each of delay amount calculation transducers included in the delay amount calculation transducer group, acquiring a reception delay amount corresponding to a distance between the reception focal point and the delay amount calculation transducer;
   selecting a plurality of the delay amount calculation transducers corresponding to the plurality of reception transducers from the delay amount calculation transducer group for each of the plurality of reception scanning lines; and
   generating the reception beam signal of the reception scanning line from the reception signal acquired from each of the plurality of reception transducers based on the reception delay amount of the selected plurality of delay amount calculation transducers,
   wherein the number of the delay amount calculation transducers included in the delay amount calculation transducer group is a number based on a width of the reception opening, the number of the plurality of reception scanning lines, an interval between the plurality of reception scanning lines, and an interval between the transducers,
   the delay amount calculation transducer group includes the plurality of reception transducers and k transducers located at one end portion of the plurality of reception transducers, and
   the number k of the transducers satisfies Expression (1) in a case in which the number of the plurality of reception scanning lines is X, the interval between the plurality of reception scanning lines is W, and the interval between the transducers is H, and the number N of the delay amount calculation transducers included in the delay amount calculation transducer group satisfies Expression (2) in a case in which the width of the reception opening is M, $$(X-1) \div 2 \times W \leq k \times H \quad (1)$$

$$N = M + k \times 2 \quad (2).$$

11. The ultrasound image generation method according to claim 10, further comprising correcting the reception delay amount by adding a predetermined uniform correction amount for each of the plurality of reception transducers corresponding to the reception scanning line.

12. The ultrasound image generation method according to claim 10, wherein:
   a plurality of pieces of information representing a correspondence relationship between the reception delay amount and the reception transducer are provided according to a positional relationship between the reception transducer and a predetermined reference scanning line among the plurality of reception scanning lines, and
   the method further comprises generating the reception beam signal by using the correspondence relationship selected according to the positional relationship between the reference scanning line and the reception transducer.

* * * * *